United States Patent [19]

Vereyken

[11] Patent Number: 4,577,879
[45] Date of Patent: Mar. 25, 1986

[54] BICYCLE

[76] Inventor: Franciscus A. Vereyken, 397 Wainwright Ave., San Jose, Calif. 95128

[21] Appl. No.: 533,829

[22] Filed: Sep. 19, 1983

[51] Int. Cl.⁴ .................. B62M 1/04; B62K 15/00
[52] U.S. Cl. .................................. 280/256; 280/278; 280/281 R; 280/287
[58] Field of Search .............. 280/253, 256, 257, 278, 280/281 R, 287

[56] References Cited

U.S. PATENT DOCUMENTS

| 594,980 | 12/1897 | Booth et al. | 280/253 |
| 3,448,997 | 6/1969 | Kosugi | 280/287 |
| 4,026,571 | 5/1977 | Vereyken | 280/251 |
| 4,400,003 | 8/1983 | de la Haye | 280/287 |
| 4,456,276 | 6/1984 | Bortolin | 280/257 |

Primary Examiner—Joseph F. Peters, Jr.
Assistant Examiner—Kenneth R. Rice
Attorney, Agent, or Firm—Townsend and Townsend

[57] ABSTRACT

A bicycle having a frame provided with a chain and sprocket assembly. The pedal cranks on the front sprocket of the sprocket assembly are pivotally coupled at their outer ends to a pair of bars near to but spaced from the front ends of the bars, the rear ends of the bars being slotted to shiftably receive a pair of pins secured to the frame. A pedal is on the front end of each bar, respectively, whereby the forward power stroke caused by pedal being driven downwardly by the rider follows a semicircular path; whereas, the pedal follows almost a substantially vertical path as moves from its lower position to its upper position during the return stroke. The frame includes at least one cable which is placed under tension to connect certain components of the frame together while eliminating excess weight to enhance the speed characteristics of the bicycle.

11 Claims, 11 Drawing Figures

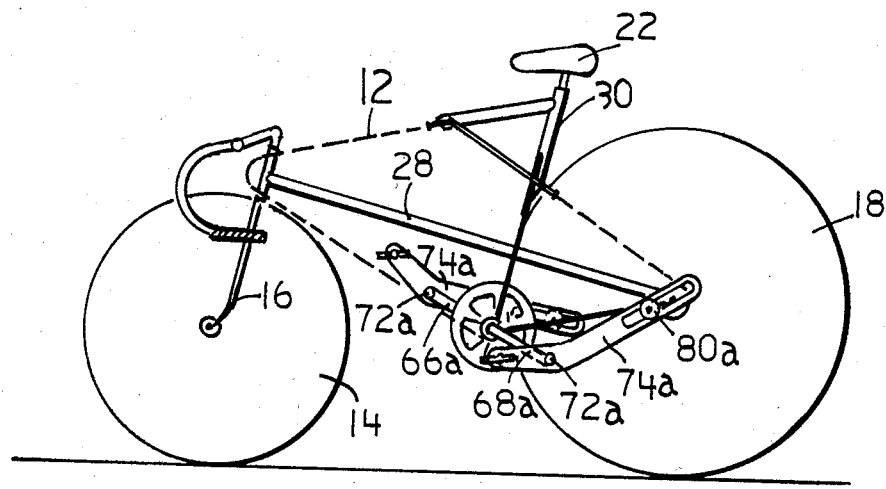
FIG. 7
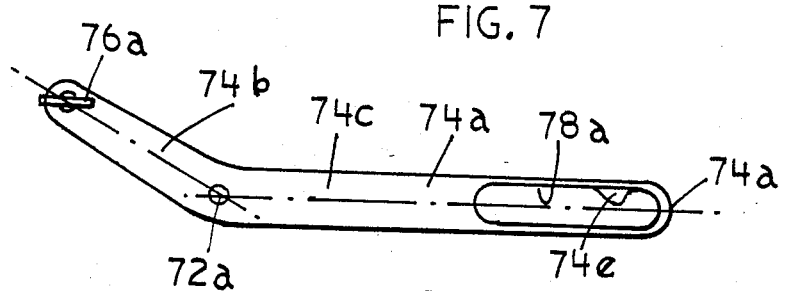
FIG. 8
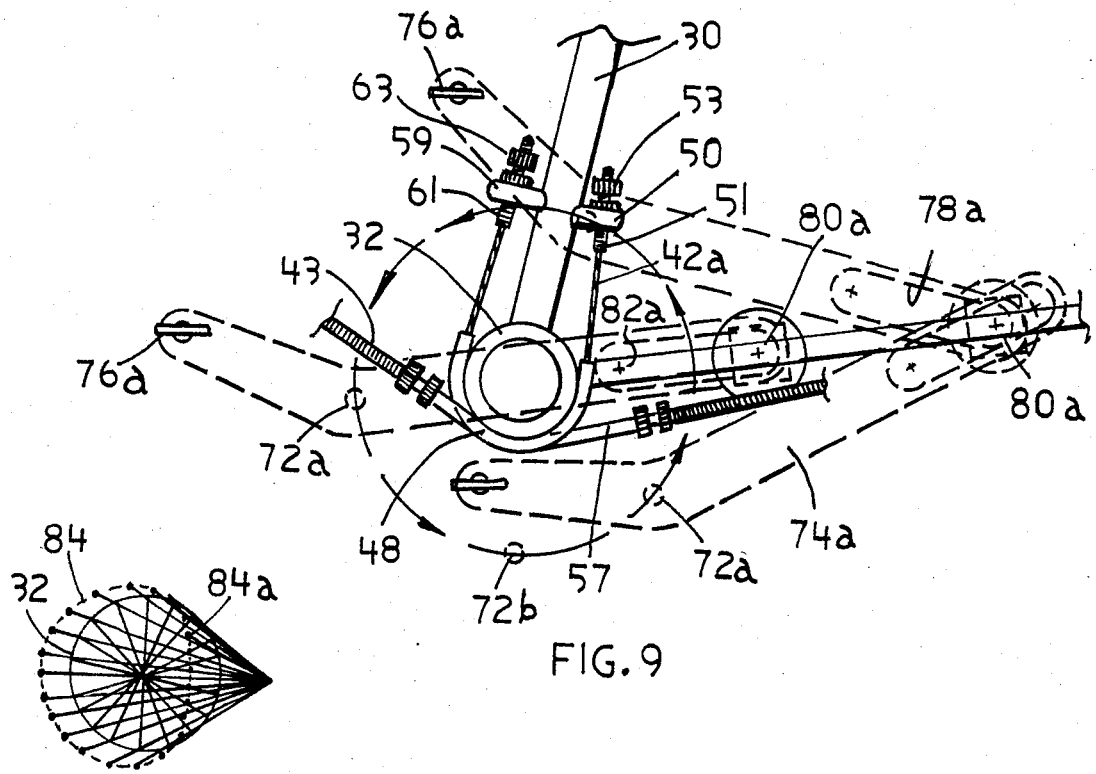
FIG. 9
FIG. 10

BICYCLE

This invention relates to improvements in bicycles, and more particularly, to a bicycle having an improved pedal drive means and an improved frame.

BACKGROUND OF THE INVENTION

In conventional bicycles, it is well known to provide a chain and sprocket assembly with the front sprocket of the assembly having pedal cranks for rotation about a hub near the lower mid-portion of the bicycle frame. The pedals traverse a circular path and the lever arms defined by the cranks have a constant length so that the power output or the efficiency of operation of the chain sprocket assembly is constant.

It is desirable and a need exists to increase the operational efficiency of the pedal drive means of a bicycle so that the rider can have greater power output for a given amount of effort. Any such increase will allow the bicycle to be propelled forwardly at a higher speed while maintaining full control of the bicycle and its drive means.

It is also desirable and a need exists to minimize the weight of the bicycle by making the various parts of the bicycle as light as possible without sacrificing the strength necessary to withstand the weight of the rider. Various attempts have been made to reduce the weight of the bicycle frame by proper selection of the metallic material which makes up the frame. While these have been satisfactory, there is room for improvement so long as the strength and durability of the overall bicycle structure remains sufficient to support the rider.

A prior patent in the field of bicycle drive means includes U.S. Pat. Nos. 594,980 and 4,026,571.

SUMMARY OF THE INVENTION

The present invention fulfills the needs mentioned above. To this end, the bicycle of the present invention includes an improved pedal drive means in which a pair of bars are pivotally mounted on the outer ends of the pedal cranks of a conventional chain and sprocket assembly so that portions of the bars extend forwardly from their pivotal connections to the cranks. The rear ends of the bars are slotted to receive pins carried by the frame of the bicycle. Pedals are provided on the front ends of the bars. Thus, as the pedal cranks are rotated, the bars are also rotated but they also reciprocate relative to the pins in the slots.

In effect, the bars increase the lengths of the moment arm of the pedal cranks when the pedal cranks move from the upper ends of their paths of travel to the lower ends, yet the lengths of the moment arms are at a minimum when the pedal cranks move from the lower ends of their paths of travel to the upper ends thereof. The result is that the rider can obtain a greater power output for a given force applied to the pedals during a power stroke, i.e., downward movement, and the pedals follow almost a substantially vertical path as they move from the lower end of the sprocket to the upper end thereof. Thus, the drive means of the present invention provides a more efficient operating system than the system provided by a conventional chain and sprocket assembly.

Another aspect of the present invention is the use of a cable under tension which is coupled to the frame of the bicycle in a manner such as to replace certain frame parts which would otherwise add to the overall weight of the frame. Since the cable is of a lightweight construction and because it has structural strength when it is under tension, the cable itself can provide the necessary structure to be combined with the remainder of the frame while effectively reducing its weight to thereby provide a bicycle which performs in an efficient manner without any loss of durability.

The primary object of the present invention is to provide a bicycle having an improved pedal drive means which provides a higher power output for the same amount of effort expended with a conventional chain and sprocket assembly to thereby improve the efficiency of the bicycle and to increase the enjoyment obtained from riding the bicycle.

Another object of the present invention is to provide a bicycle of the type described which has an improved frame comprised of a cable under tension to provide the necessary strength for the bicycle frame while reducing its weight to thereby enhance its efficiency and allow it to be propelled forwardly at a higher speed due to its reduced weight.

Other objects of this invention will become apparent as the following specification progresses, reference being had to the accompanying drawings for several embodiments of this invention.

IN THE DRAWINGS

FIG. 7 is a view similar to FIGS. 1 and 6 but showing a third embodiment of the bicycle;

FIG. 8 is an enlarged side elevational view of one of the drive arms of the bicycle of FIG. 7;

FIG. 9 is an enlarged, fragmentary side elevational view of the hub portion of the bicycle of FIG. 6; and FIG. 10 is a graphic view of the locations of a pedal of the bicycle as the pedal revolves about the pedal crank axis.

Figure 1:
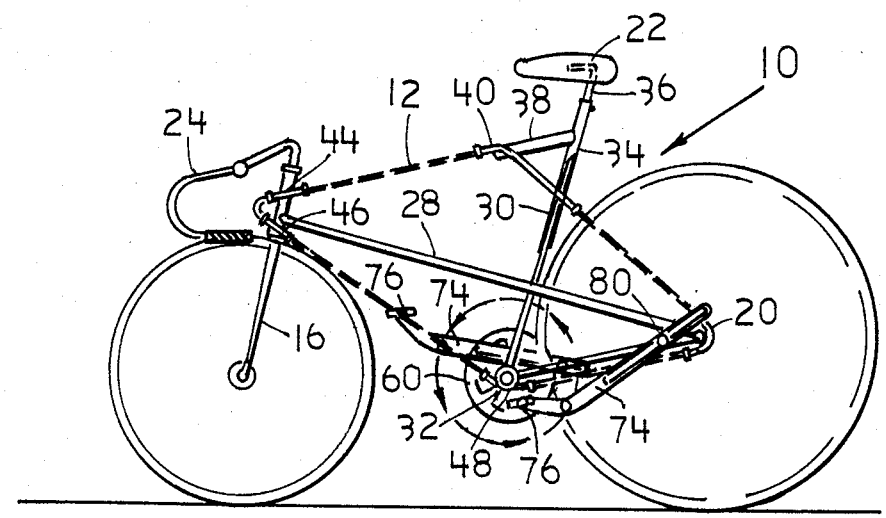
FIG. 1 is a side elevational view of the improved bicycle of the present invention.

A first embodiment of the bicycle of the present invention is broadly denoted by the numeral 10 and includes a frame 12, a front wheel 14 mounted on the fork of the frame, and a rear wheel 18 mounted on the rear hub 20 of frame 12. The diameter of wheel 14 is smaller than the diameter of wheel 18 so that a person riding the bicycle and sitting on seat 22 while holding onto handle bar 24 will lean considerably forwardly and downwardly to minimize air drag forces which would otherwise tend to limit the forward speed of the bicycle.

Frame 12 includes a front hub 26 on which fork 16 is pivotally mounted. A diagonal brace 28 extends rearwardly to rear hub 20. A generally upright, rigid segment 30 extends downwardly to a pedal crank hub 32 and has an upper, tubular end 34 for receiving the shaft 36 of seat 22.

Figure 4:
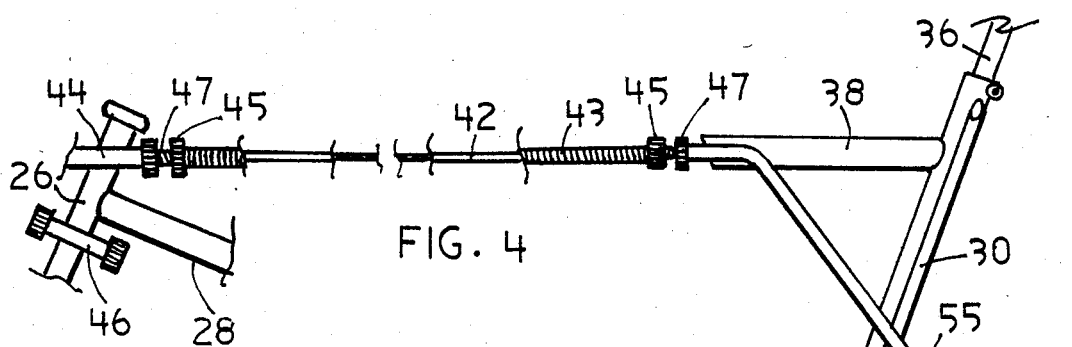
FIG. 4 is an enlarged, fragmentary view of the frame of the bicycle of FIG. 1.
Figure 4A:
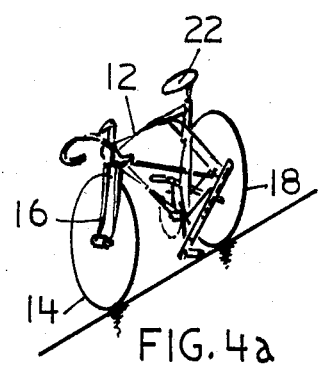
FIG. 4a is a perspective view of the bicycle of FIG. 1.

A stub segment 38 (FIGS. 1 and 4) is rigid to and extends forwardly from the upper end of frame segment 30. A pair of diagonal, tubular guides 40 (only one of which is shown in FIGS. 1 and 4) are rigidly secured to upright segment 30 and segment 38 for receiving a pair of flexible cables 42 which are used as lightweight frame parts to eliminate the relatively heavy bars which ordinarily comprise the bicycle frame. Each cable 42 is housed in a number of sheaths segments 43, a pair of such sheaths 43 being shown for a particular cable 42 in FIG. 4.

Figure 5:
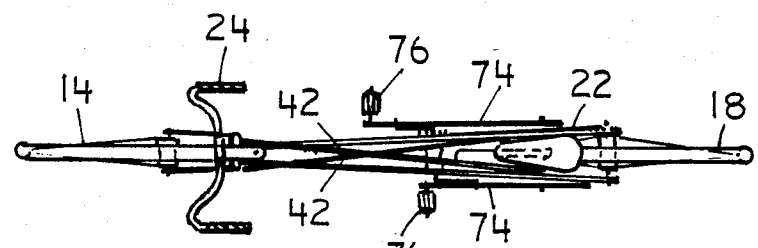
FIG. 5 is a top plan view of a slightly modified form of the bicycle of FIG. 1.

Each cable 42 extends forwardly from its respective brace 40 to a respective tubular brace 44 rigid to the upper end of front hub 26. The cables 42 criss-cross as they extend forwardly of segment 38 as shown in FIG. 5. Each sheath 43 is of a coil spring configuration and has a nut 45 at each end, respectively. Nuts 45 are adapted to be threadly coupled onto screws 47 at the adjacent ends of guides 40 and 44.

Each cable 42 extends downwardly from the front end of each guide 44 and into and through a lower guide 46 secured to the lower end of hub 26 as shown in FIG. 1. The cable then extends downward through a sheath 43 to a tubular guide 47 partially surrounding the lower end of hub 32 (FIG. 9). The cable then extends upwardly and through a projection 50 rigid to and extending rearwardly from upright segment 30, the cable having one end provided with a screw 51 which is threadably coupled to a nut 53 for adjusting tension in the cable.

Similarly, each cable 42 extends downwardly and rearwardly from a respective guide 40 (FIG. 4), then through a guide 55 (FIG. 1) carried by rear hub 20, then forwardly of guide 55 to a guide 57 similar to and adjacent to a guide 47. The corresponding cable then extends upwardly and through a projection 59 and has a screw 61 thereof for threaded attachment to a nut 63. By manipulating the nuts 53 and 63, the tension forces on each cable 42 can be adjusted to provide a frame which is a unitary construction, yet is of a weight which is lighter than the weight which it ordinarily would have with a frame of all-metal construction. The cable construction mentioned above therefore provides a light weight frame to allow the speed of the bicycle to be increased due to the reduced inertia thereof.

Figure 2:
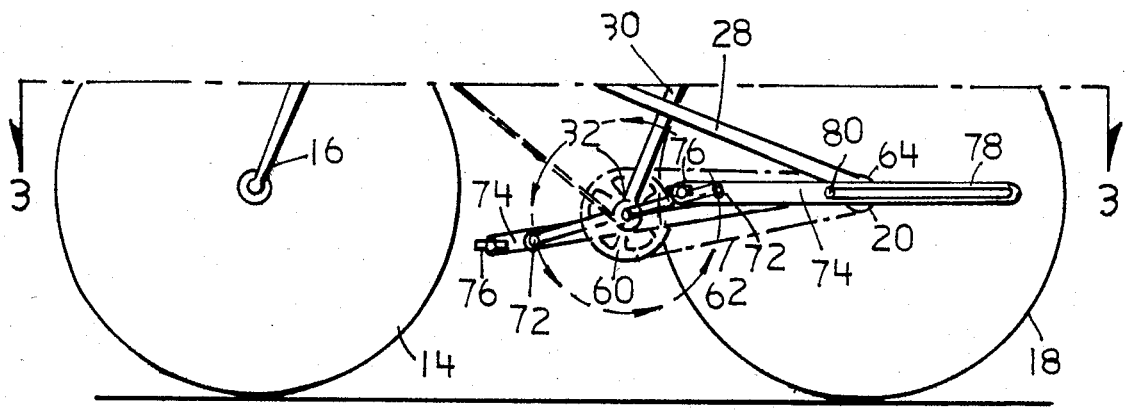
FIG. 2 is a view similar to FIG. 1 but showing slightly modified version of the bicycle.

The bicycle shown in FIG. 2 has substantially the same frame construction as that shown in FIG. 1. The only difference between the embodiments of FIGS. 1 and 2 is that FIG. 1 has a front wheel of a diameter less than the diameter of the rear wheel; whereas the diameters of the front and rear wheels of the embodiment of FIG. 2 are the same. Cables 42 and sheaths 43 are not shown in FIG. 2.

The improved bicycle of the embodiments of FIGS. 1 and 2 has an improved pedal crank structure which includes a sprocket 60 rotatably mounted on the hub 32 of the bicycle frame. A chain 62 is coupled with sprocket 60 and with a rear sprocket 64 carried by hub 20 in the conventional manner. A pair of pedal cranks 66 (FIG. 3) are carried by hub 32 for rotating sprocket 60 in a direction of the circular arrows in FIG. 2.

Figure 3:
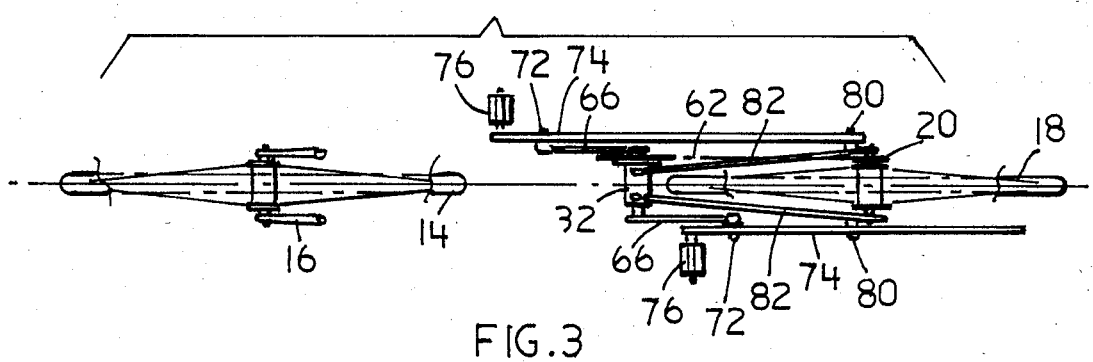
FIG. 3 is a cross-sectional view taken along line 3—3 of FIG. 2.

The outer end of each of pedal crank 66 is pivotally coupled by a pin 72 to a rigid bar 74 which has a pedal 76 rotatably mounted on the forward end thereof, such forward end being spaced from pin 72 as shown in FIG. 3.

Each bar 74 has a rear slot 78 (FIG. 2) which receives a pin 80 extending laterally from the rear frame parts 82 forming portions of frame 12. Slot 78 and pins 80 allow bars 74 to shift forwardly and rearwardly as the rider of the bicycle pedals the bicycle in the normal fashion. However, since the pedals 76 are spaced forwardly from the pins 72 which connect to bar 74 to cranks 66, the feet of the rider will not describe a circular arc concentric with arc 70 of FIG. 2. Instead, each pedal will follow a generally semicircular path 84 when the pedal moves during the power stroke from the top of its arc to the bottom of its arc (FIG. 10); however, the pedal rapidly rises as shown by segment 84a at the right hand side of the pivot axis of hub 32. In this way, the pedals on their return strokes will rise quickly (almost along a straight line) and without any substantial effort on the part of the rider. All of the foregoing is achieved by the improved manner of connecting pedals 76 to cranks 66 by the use of bars 74. Such bars 74 effectively increase the moment arm of the pedals during the power stroke and decrease it for the return stroke.

In use, the rider will pedal the bicycle so that the outer ends of the cranks 66 will transverse the circular path 70 of FIG. 2. However, pedals 76 will themselves transverse the paths 84 and 84a (FIG. 10) and, as stated above, this assures that less effort is needed on the part of the rider so that output efficiency can b increased by riding bicycle 10 as compared with riding a conventional bicycle.

Bars 74 smoothly and easily move relative to pins 80 back and forth as the pedals are rotated above the axis of hub 32. Suitable bearings can be provided on pins 80 to assure substantial friction free movement of the bars relative to the pins.

Figure 6:
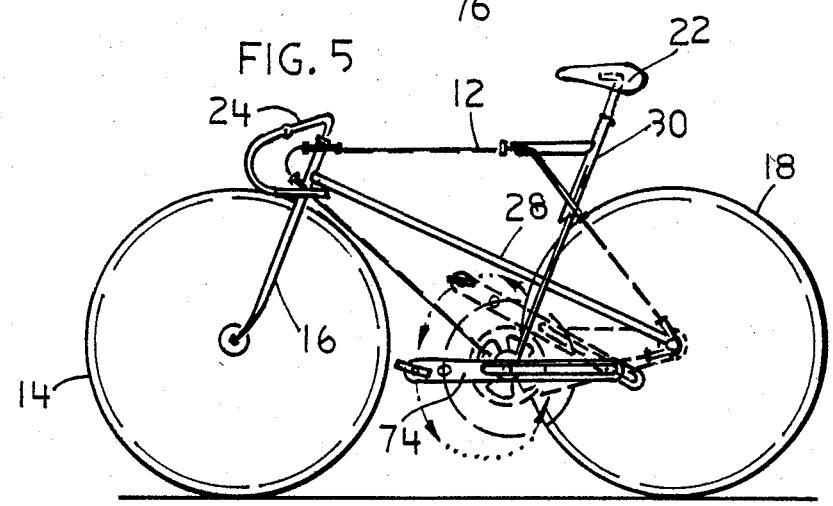
FIG. 6 is a side elevational view of the bicycle of FIG. 5.

FIGS. 5 and 6 show a slightly modified form of the bicycle of FIGS. 1-3. Whereas the bicycle of FIGS. 1-3 shows pins 80 near the rear end of hub 20 of the bicycle frame, FIGS. 5 and 6 show pins 80 at locations forwardly of the locations of the pins in FIGS. 1-3. This allows for a shorter length for bars 74 without any substantial change in the paths traversed by pedals 76, such as the paths 84 and 84a (FIG. 10). The frame of the bicycle of FIGS. 5 and 6 also uses cables 42 as described above with respect to the embodiment of the bicycle shown in FIGS. 1-3.

Another embodiment of the bicycle is shown in FIGS. 7 and 9. In this embodiment, a pair of relatively short arms 74a, one of which is shown in FIG. 8, are pivotally mounted near their front ends by pins 72a on the outer end of pedal cranks 66a and 68a (FIG. 7) substantially the same as pedal cranks 66 and 68 of the embodiment of FIGS. 1-3. Each arm has a relatively short slot 78a for receiving a pin or bearing 80a, pin 80a being shiftably mounted on a frame member 82a secured to and extending rearwardly from the sprocket hub 32 of the bicycle frame (FIG. 9). Pin 80a can shift back and forth along the length of frame member 82a and suitable means (not shown) is provided for this purpose. A pair of operative positions of the pin are shown in FIG. 9.

In the upper dashed line position of arm 74a in FIG. 9, downward movement on the pedal 76a at the front end of the arm will cause the rear portion 74d (FIG. 8) of the arm to engage pin 80a in its rearward position and force it forwardly along member 82a until the arm is in the center of the power stroke as shown in the central dashed line position of arm 74a as shown in FIG. 9. Then, continued downward movement of the front end of arm 74a will cause a spring biased detent 74e (FIG. 8) extending into slot 78a to engage pin 80a and force it rearwardly along frame member 82a until the pivot pin 72a coupling the arm 74a the sprocket reaches a location identified by the numeral 72b (FIG. 9). Then, the pin 80a will be at its rear end of travel and will engage detent 74e (FIG. 8) and push the detent out of the slot into the dashed line position shown in FIG. 8 so that continued rearward movement of arm 74a, such as into the lower dashed line position of FIG. 9, will allow the pin 80a to move forwardly in slot 78a of arm 74a until the forward movement of arm 74a commences once again. Continued forward movement of the arm 74a will continue until the pin engages the rear portion 74d of the arm and the above process is repeated.

By providing a relatively short arm and by moving the connection pin such as pin 80a along the adjacent bicycle frame part, an increase in the power output and efficiency of the bicycle can be achieved. The resulting path traversed by the pedals 76a is substantially the same as that shown in FIG. 10.

What is claimed is:

1. A bicycle comprising: a frame; a front wheel and a rear wheel rotatably mounted on the frame; a chain and sprocket assembly coupling the frame and the rear wheel to allow for forward movement of the wheels over a surface, said assembly including a sprocket and a pair of cranks rotatably mounted on the frame and coupled to the sprocket; and a pair of bars, there being a bar for each crank, respectively, each bar having a front end and a rear end and a longitudinal slot near the rear end thereof, each crank having an outer end pivotally coupled to the corresponding bar near to but spaced from the front end of the respective bar, there being a pedal on the forward end of each bar, respectively, and pin means carried by the frame and shiftably received within the slot of the respective bar for pivotally coupling the rear part of the respective bar to the frame, each bar permitting the respective pedal to follow a generally semicircular path when the pedal moves during its power stroke from the top of its arc forwardly and then downwardly to the bottom of its arc, each pedal traversing a curved, substantially vertical path as it returns to the top of its arc from the bottom of its arc, whereby the pedal will return quickly to the top of its arc from said bottom of its arc.

2. A bicycle as set forth in claim 1, wherein the pin means includes a pair of pins extending laterally from the frame near the rear end of the frame.

3. A bicycle as set forth in claim 2, wherein the bicycle frame has a rear wheel hub, the pins being adjacent to said hub.

4. A bicycle as set forth in claim 2, wherein the frame has a rear wheel hub, said pins being carried by the frame and at locations spaced forwardly from said rear wheel hub.

5. A bicycle as set forth in claim 1, wherein said frame includes a front wheel, a fork for the front wheel, a hub for rotatably mounting the upper end of the fork, an upright frame segment for mounting a seat on the frame, and cable means coupling the hub with said upright segment.

6. A bicycle as set forth in claim 5, wherein is included means for adjustably changing the tension on said cable means.

7. In a bicycle: a frame; a chain and sprocket assembly for coupling the frame to a rear wheel, said assembly including a sprocket and a pair of cranks rotatably mounted on the frame and coupled to the sprocket; and a pair of bars, there being a bar for each crank, respectively, each bar having a front end and a rear end and a longitudinal slot near the rear end thereof, each crank having an outer end pivotally coupled to the corresponding bar at a location on the bar spaced from one end of the bar, there being a pedal on said one end of each bar, respectively, there being pin means carried by the frame and shiftably received within the slot of the respective bar for pivotally coupling the rear part of the respective bar to the frame, each bar permitting the respective pedal to follow a generally semicircular path when the pedal moves during its power stroke from the top of its arc forwardly and then downwardly to the bottom of its arc, each pedal traversing a curved, substantially vertical path as it returns to the top of its arc from the bottom of its arc, whereby the pedal will return quickly to the top of its arc from said bottom of its arc.

8. In a bicycle as set forth in claim 7, wherein the pin means includes a pair of pins extending laterally from the frame.

9. In a bicycle as set forth in claim 8, wherein said pins are carried by the frame and at locations spaced forwardly from said rear end thereof.

10. A bicycle comprising: a frame including a fork; a front wheel on the fork and a rear wheel rotatably mounted on the frame; a hub for rotatably mounting the upper end of the fork; an upright frame segment for mounting a seat on the frame; and cable means coupling the hub with said upright segment, said frame having a sprocket hub and a rear wheel hub, said cable means extending downwardly and rearwardly from said upright segment and about the rear wheel hub and then forwardly and partially about the sprocket hub, another portion of the cable extending rearwardly from the front wheel fork hub and partially about said sprocket hub, and means for adjustably securing the ends of the cable to the upright segment; a chain and sprocket assembly coupling the frame and the rear wheel to allow for forward movement of the wheels over a surface, said assembly including a sprocket and a pair of cranks rotatably mounted on the frame and coupled to the sprocket; and a pair of bars, there being a bar for each crank, respectively, each crank being pivotally coupled to the corresponding bar near to but spaced from the front end of the respective bar, there being a pedal on the forward end of each bar, respectively; and pin means pivotally coupling the rear part of each bar, respectively, to the frame.

11. In a bicycle: a frame having a fork for a front wheel, a hub for rotatably mounting the upper end of the fork, an upright frame segment for mounting a seat on the frame, cable means coupling the hub with said upright segment, means for adjustably changing the tension on said cable means, said frame having a central sprocket hub and a rear wheel hub, said cable means extending downwardly and rearwardly from said upright segment and about the rear wheel hub and then forwardly and partially about the sprocket hub, another portion of the cable extending rearwardly from the front wheel fork hub and partially about said sprocket hub, means for adjustably securing the ends of the cable to the upright segment.

* * * * *